Sept. 30, 1969  H. G. JOHNSON  3,470,291
FORMING THERMOPLASTIC ARTICLES

Filed June 30, 1966  2 Sheets-Sheet 1

INVENTOR:
HERBERT G. JOHNSON
BY: *Martin S. Baer*
HIS ATTORNEY

Sept. 30, 1969  H. G. JOHNSON  3,470,291

FORMING THERMOPLASTIC ARTICLES

Filed June 30, 1966  2 Sheets-Sheet 2

INVENTOR:
HERBERT G. JOHNSON
BY: *Martin S. Baer*
HIS ATTORNEY

United States Patent Office 3,470,291
Patented Sept. 30, 1969

3,470,291
FORMING THERMOPLASTIC ARTICLES
Herbert G. Johnson, Havertown, Pa., assignor to Shell Oil Company, New York, N.Y., a corporation of Delaware
Filed June 30, 1966, Ser. No. 561,871
Int. Cl. B29b 7/24
U.S. Cl. 264—292                                    12 Claims

ABSTRACT OF THE DISCLOSURE

A method is disclosed for the shaping of plastic sheet into shaped articles of moderate draw depth. The method is suitable for large scale production of thick-walled thermoplastic items. It consists of forming a thermoplastic sheet at a temperature substantially below that at which it can be thermoformed, by forcing a thick body of elastomer into contact with one surface of the sheet, opposite a non-yielding die. The sheet is deformed under tensile stress as the elastomer tends to move with the sheet. The sheet is held in contact with the die until stress is substantially relieved. The formed articles conform substantially to the shape of the die, exhibitiing little or no shrinkage or spring-back.

---

This invention relates to a method of forming thermoplastic articles. More particularly, it relates to a method for shaping sheets or plates of thermoplastic polymers into shaped articles by a simple forming operation at temperatures below those at which such sheets or plates can be thermoformed.

The term "sheet" generally implies a maximum thickness of about ¼ inch. To simplify the disclosure and claims, the term "sheet" is defined herein as a flat article having a substantially uniform thickness of at least 0.01 inch and extending substantially in the two other dimensions, e.g., having its length and breadth each at least five times the thickness. The thickness may be as much as two or three inches. "Sheet" thus comprises some articles conventionally designated "film" as well as those conventionally designated "plate."

In essence, the method of this invention comprises forming an article from sheet of thermoplastic polymer by shaping such sheet between a substantially rigid die and a confined body of yieldably deformable material, such as rubber, while said sheet is at a working temperature above its glass transition temperature and below the thermoforming temperature as hereinafter defined.

One mode of practicing this invention comprises placing a sheet of thermoplastic material which is at a working temperature in the above-defined range into contact with a non-yielding die and forcing a confined body of yieldably deformable material, such as a rubber pad, against substantially the entire area of the surface of the sheet opposite the die with sufficient force to cause the sheet to conform to the shape of the die, retaining the sheet and die in forced engagement for a sufficient period to permit the stress in the formed article to be relieved, typically a period in the range from 1 second to about 1 minute, and releasing the formed article from the die. Articles formed in this manner have dimensions which are substantially unchanged from their dimensions while in forced engagement with the die.

The method of this invention is particularly advantageous in forming of articles from thick sheets, e.g., in thicknesses of ½ inch and up, since it does not involve a prolonged cooling period as part of the shaping step, unlike other methods which are in commercial use today.

Another particular advantage of the method of this invention is that it permits forming of articles having multi-layer walls of thermoplastic polymer, and especially those composed of layers of different polymers, which cannot be produced by thermoforming methods in the usual case where the softening or meltiing points of the polymers differ substantially.

The method of this invention is adapted to large scale production of thick-walled thermoplastic items, such as appliance lids and housing, corrugated panels, luggage shells, and so forth.

A great variety of methods for forming articles from thermoplastic sheets have been developed and are in use today. These are essentially all modifications of the so-called "thermoforming" method in which plastic sheet is heated to a thermoforming temperature at which it can be readily deformed under atmospheric or similarly low mechanical or pneumatic pressure, and is then forced into or over a mold or die by vacuum or slight pneumatic pressure, often with a mechanical "plug assist." The formation of thermoplastic articles from sheet by thermoforming methods—including vacuum forming—is characterized by the fact that sheet is shaped at a thermoforming temperature at which the polymer acts essentially like a liquid and provides no substantial resistance to flow even at very moderate pressures such as atmospheric pressure, except where frictional resistance must be overcome. At such temperatures, thermoplastic sheet "drapes" or sags under its own weight. When an article is formed at this temperature, it must be substantially cooled before it can be removed from the mold. Cooling must be controlled to avoid warping or internal defects. Accordingly, such methods tie up expensive equipment for the period of time required to cool the polymer carefully to a temperature at which it is sufficiently rigid to retain its shape on removal from the mold. Time requirements increase rapidly with increasing thickness of the molded article. A typical time cycle in vacuum forming of polypropylene sheet of 100 mil thickness is 1½ minutes.

A complicating factor in the shaping of thermoplastic materials at high temperatures is the fact that there is a substantial contraction of the material between its melt temperature and room temperature. As a result, the finished shaped articles do not usually conform to the precise shape of the mold, and a change in dimension must be taken into account when producing the mold.

Other widely used methods of forming thermoplastic articles, e.g., injecting molding, blow molding, and extrusion, also involve conversion of the polymer to a melt and resultant cooling requirements which add to the complexity and expense of the equipment or result in excessively long time cycles for making thicker articles.

In the method of this invention, articles are rapidly formed from thermoplastic sheet at temperatures below polymer. For the sake of convenience, forming at these lower temperatures will be referred to herein as cold-forming, even though the polymer being formed may be at an elevated temperature close to, but below, its thermoforming temperature.

In developing the method of this invention it was found that cold-forming of thermoplastic sheet, and particularly of polypropylene sheet, is attended by unexpected difficulties. In attempts to perform such cold-forming on sheets of polypropylene having thicknesses of 1/32 inch to ⅛ inch or more between matched rigid dies, it proved impossible to form articles conforming substantially to the shape of the dies due to a large degree of "springback" of the plastic sheet, e.g., exceeding 25 percent. Springback is the difference between a given dimension of the shaped article and of the die in which it is shaped, after taking into account thermal shrinkage.

Another problem in cold-forming of plastic sheet is that the plastic tends to wedge between two closely spaced rigid surfaces such as the punch and die, resulting in tearing or scuffing of the resulting surfaces. The closer the clearance, the greater the difficulty in maintaining material flow—especially where such clearance progressively decreases in the direction of flow. Due to the slick nature of the plastic surface, any lubrication originally applied to the sheet or to the tools may break down under pressure, causing the plastic to tend to stick to the tools and to tear or scuff. This in turn builds up increased resistance to flow.

A characteristic of polypropylene and other plastics which contributes greatly to the difficulty of cold-forming is high compressibility. In an attempt to shape polypropylene between relatively moving metal surfaces such as a punch and die, any resistance to flow such as friction results in a corresponding buildup of back pressure, which in turn appreciably compresses the plastic. This causes a further increase in wedging action and resistance to flow—so that when the pressure is released the plastic tends to spring back violently or even to blow apart.

The method of this invention overcomes the above-mentioned disadvantages of cold-forming between matched non-yielding dies. It was surprisingly found that 0.01 to 1 inch thick sheets of thermoplastic material such as polypropylene, polystyrene or ABS, cold-formed according to this invention between a metal die and a pad of yieldable elastomeric material, can be readily shaped to conform precisely to the die without springback or with insignificant springback in very short forming cycles, typically in the range from 1 second to 1 minute, depending on the thickness and temperature of the sheet, and with little or no whitening of thinned parts.

Unlike metal dies in cold-forming of plastic sheets, the yieldable die mass tends to move with the plastic surface with which it is in contact; consequently there is relatively little frictional stress developed. Because only one inflexible metal surface is engaged by the plastic sheet, there is no chance of "wedging," jamming or galling—with resultant tearing and scuffing. Because there is little resistance to flow due to friction, wedging or galling, there is very little buildup of compression stress. It is believed that this is the major factor to which reduced springback in the formed article must be attributed.

A major difference between the process of this invention and either the thermal sheet-forming methods of the art or the method of forming sheet between matched metal dies is that the use of a die of yieldable material in accordance with this invention results in shaping of the plastic sheet under tensile stress. This results in a unique advantage of this invention, that any substantially thinned sections show a strengthening effect of orientation. Since the thinned portions are usually the outer edges and corners of the article, which are exposed to the most substantial stresses during use, it is desirable that they be stronger than the rest of the article, rather than weaker, as they are in thermoformed articles.

The use, as a die, of a yieldable material such as rubber also results in certain known advantages not attainable in forming between metal dies. Thus, reverse curved shapes and re-entry dimensions can be created which would be impossible with any other than a fluid forming method. In general, most relatively thin plastic shapes can be snapped off or out of a metal form having such dimensions without necessity of providing collapsing or split tools, because of the elasticity of such plastic articles.

Broadly stated, this invention permits shaping sheet-stock of thermoplastic polymer in any thickness into shapes comparable to those made by thermoforming. Compared to thermoforming it has a much faster forming cycle, especially for thick sections; reduces the amount wasted as trim; results in improved impact strength of thinned out sections which, in thermoformed articles, are weaker than the body of the article but in the method of this invention are stronger; and permits forming complex shallow draws without wrinkling due to sheet sag.

Accordingly, it is the primary object of this invention to provide a simple, rapid, economical method for forming commercially useful articles from sheets of thermoplastic polymers.

A more specific object is to provide a method for converting sheets of thermoplastic polymers which result in excessive spring-back when shaped between rigid dies at temperatures below their thermoforming temperature into articles which conform in dimensions substantially to the forming die.

A further object is to provide methods for forming useful articles from relatively thick sheets of thermoplastic polymers in cycle times ranging from one second to one minute.

Further objects of this invention will appear from the following description thereof, which is made in part by reference to the drawing wherein.

The apparatus employed in the practice of this invention may be substantially the same as that shown for pneumatic molding of articles from agglomerated fibrous materials as described in U.S. Patent 1,260,002 to Lanhoffer, or in forming sheet metal between a die and a confined body of yieldable material, such as a rubber pad, as described in U.S. Patent 2,190,659 to Guerin, and in section 13 of "Die Design Handbook," ASTE, McGraw-Hill Book Company, Inc., 1955.

Figure 1:
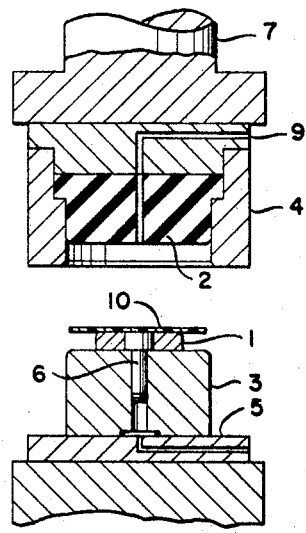
FIGURE 1 is a simplified view, in vertical section, of apparatus employed in carrying out one mode of the process of this invention, utilizing a rigid male die member and yieldable female die member, showing plastic sheet in position for molding prior to engagement of the die members.
Figure 2:
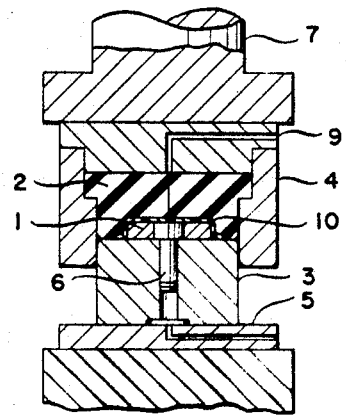
FIGURE 2 is a view of the apparatus of FIGURE 1 while the die members are in full engagement.
Figure 3:
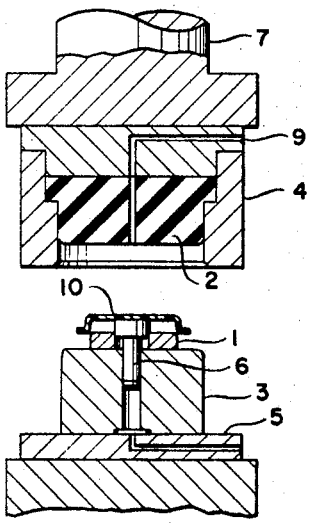
FIGURE 3 is a view of the apparatus of FIGURE 1 after the die members have been disengaged and the molded article released from the die.

Turning now to the drawing, in which like symbols refer to like parts in the several figures, the apparatus illustrated in FIGURES 1, 2 and 3 is part of a conventional hydraulic press, utilizing a die system according to this invention. The die set comprises a rigid male die member 1 and a yieldable female die member 2.

Die member 1 may be constructed of metal or other conventional non-yielding material. It is mounted on a block 3 and base 5 below pressram 7 of a single-acting hydraulic die-press, or on the lower ram of a double-acting die press. Block 3 and its base 5 together contain suitable form-ejecting means, here illustrated by pneumatically activated piston 6.

Die member 2 is typically made of rubber or of a rubber-like material or composition. This includes any elastomeric materials, such as vulcanized rubber and synthetic elastomers, which have sufficient rigidity to retain their shape when not under pressure and which are within their elastic limits, capable of flow similar to that of a liquid, when under pressure during the forming process. The chemical composition of the elastomer is of no consequence from the point of view of this invention, provided it has the desired physical characteristics, is not degraded at the desired operating temperature, and is chemically inert to the thermoplastic material being formed. A rubber composition resembling tire stock is suitable. Polyurethane rubber may be employed for longer life. Life of the rubber can also be prolonged by using a thin cover sheet to take the maximum wear and replacing this periodically. The cover sheet may also be rubber or similar suitable composition. The volume of elastomeric material in the yieldable die member should be at least three times the volume of the part being formed.

Die member 2 is confined in housing 4 which is suitably attached to the head of ram 7, and which confines the elastomer when the dies are engaged, and prevents its lateral expansion. Air passage 9 through housing 4 and elastomer 7 permits removal of air from the confined space created when the ram is lowered and breaking vacuum after a part has been formed.

After a plastic sheet 10 is mounted on die 1 as shown in FIGURE 1, the ram carrying yieldable die member 2 moves down into engagement with rigid die 1. The fully engaged dies are illustrated in FIGURE 2. As shown, the upper part of block 3 has entered the lower opening of housing 4 and forms part of the space in which yieldable die 2 is confined. The dies are retained in engagement for a brief period, typically from 1 second to about 1 minute, sufficient to relieve stress in the molded sheet. In any production run, a few simple tests at different times will permit determination of the minimum required stress relief period. At the end of this period, ram 1 is withdrawn and the shaped form ejected as shown in FIGURE 3.

Figure 4:
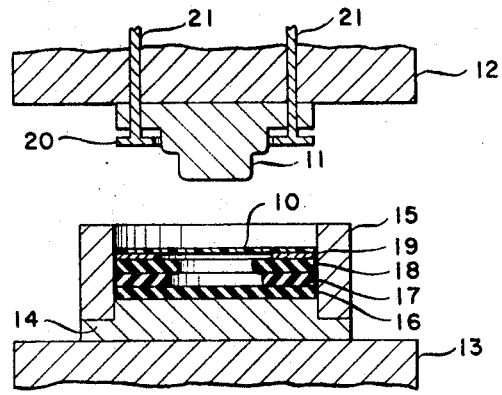
FIGURE 4 is a simplified view, in vertical section, of apparatus employed in carrying out another mode of the process of this invention, showing plastic sheet in position for molding prior to engagement of the die members.

An equally practical alternative method is illustrated in FIGURE 4. In this method, a rigid die 11 is suitably attached to the head 12 of the upper ram of a single-acting or double acting press, and the yieldable die is mounted on the base or lower ram-head 13. The yieldable die, confined in a housing formed by base 14 and die retainer sleeve 15, is formed of a lower solid rubber pad 16 and two rubber pads 17 and 18 which have central openings slightly larger than the cross section of the male die. FIGURE 4 illustrates the loaded but disengaged position of the dies, in which thermoplastic sheet 10 has been placed on ring-shaped pressure plate 19, which rests on the uppermost rubber pad 18. Blank-holder 20 is provided to hold work-blank 10 firmly against the pressure plate during the shaping operation. The blank holder is suitably a ring movable by several rods 21. An air removal passage may be provided in the yieldable die and a form rejection means in the rigid die as illustrated in FIGURE 1. In the operation of the method of this invention with the apparatus of FIGURE 4 the blank-holder is brought into engagement before rigid die 11 contacts the thermoplastic sheet. Otherwise operation is identical in principle with operation using the apparatus of FIGURE 1.

Figure 5:
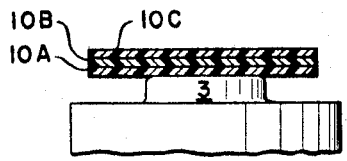
FIGURE 5 is a simplified view of part of the apparatus illustrated in FIGURE 1, showing a multiple number of sheets in position for molding.
Figure 6:
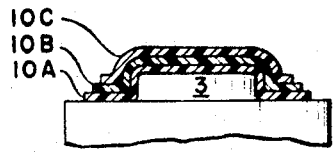
FIGURE 6 is a view of the apparatus of FIGURE 5 after the sheets have been shaped.

FIGURES 5 and 6 illustrate the simultaneous shaping of a multiple number of sheets 10A, 10B and 10C, showing only the rigid male die 3, prior to engagement of the dies in FIGURE 5 and after completion of shaping in FIGURE 6. In this method of operation, each sheet is formed into a separate article. The sheets may be of identical or different composition. The dimensions of the articles will obviously vary from each other, the diameter of 10B being greater than that of 10A, etc. The method is suitable where such variation is not objectionable.

Figure 7:
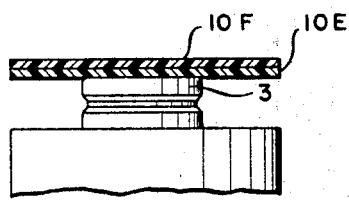
FIGURE 7 is a simplified view of part of the apparatus of FIGURE 1, utilizing a modified male die in the molding of a multiple number of sheets for the production of multi-wall articles.
Figure 8:
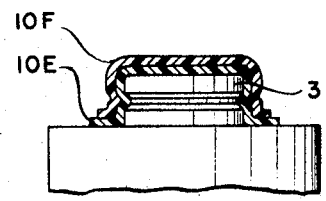
FIGURE 8 is a view of the apparatus of FIGURE 7 after the sheets have been shaped.

FIGURES 7 and 8 illustrate the formation of a single article consisting of two layers of different plastics, 10E and 10F. In this case, male die 13 has a sufficient undercut at some location to provide a locking engagement between the layers of plastic in the finished article. Plastics normally have sufficient elasticity to permit ready ejection from a form having a slight undercut. The blank consisting of sheets 10E and 10F may be a laminate, but it is preferred to employ two separate sheets.

Preferred embodiments of this invention have been described. The method is, however, capable of numerous modifications while remaining within the scope of this invention. For example, it is not essential that the rigid die or its base be capable of sliding into the housing of the yieldable die. In an alternative mode, one or several rigid forms are placed on the bottom plate or bottom ram of a press, covered by a plastic sheet to be formed, and an elastomer pad confined against lateral movement is brought down by the opposing ram and pressed down over the sheet and onto the bottom plate or ram.

The shape, bulk, hardness and distribution of the yieldable die can be varied or controlled to provide variable unit pressures over selected areas of a blank or form, thus permitting some localized control of shape and thickness of the formed article. Many other modifications within the scope of this invention will occur to persons skilled in this art.

The method of this invention is particularly useful in the forming of articles from sheets of polymers which have a high degree of springback when molded between matched rigid dies. Polypropylene of commerce, exemplified by isotactic polypropylene, is such a polymer. Another is polyvinyl chloride. The invention is particularly suitable for polymers which normally exhibit relatively high crystallinity and thus are characterized by a relatively sharp melting point and by their capability of being strengthened by orientation. However, non-crystalline polymers can also be formed by the method of this invention. The method can, for example, be successfully practiced with sheets of polypropylene, polyvinyl chloride, cellulose acetobutyrate, polystyrene, ABS-polymer (a copolymer of acrylonitrile, butadiene and styrene), and acrylic polymer (Plexiglas, a polymethylmethacrylate) and a polycarbonate. The invention is also useful in forming either high density or low density polyethylene and in general, thermoplastic polymers such as polyolefin, cellulose esters, poly(vinyl benzenes) and their copolymers such as ABS, acrylics and polycarbonates. The thermoplastic sheets for use in this invention may be polymer compositions containing a single polymer or copolymer or blends of polymers or copolymers, and may contain such conventionally added materials as stabilizers against thermal or actinic degradation, dyes or pigments, impact improvers such as rubbers, and the like. The presence of fillers of various types, including powdered and fibrous materials, e.g., talc, glass fibers or asbestos, can be tolerated but is generally not preferred. Long-fibered fillers are generally undesirable.

The method of this invention is useful with polymers having molecular weights higher than can be accommodated in conventional molding operations, e.g., weight average molecular weights above about 1,000,000, but it is equally applicable to solid thermoplastic polymer compositions in the molecular weight range conventionally employed in production of plastic articles, e.g., weight average molecular weights above about 10,000 the lower limit being different for different polymers.

In one special mode of practicing this invention, multi-wall articles are formed by molding two or more superimposed sheets differing in composition. This may comprise different formulations of a single type of polymer or sheets made up of different polymers. In this manner, desirable combinations of properties may be obtained in articles which could not be formed by thermoforming methods when the different compositions differ significantly in melting point or softening range. For example, a clear, glossy acrylic sheet, such as a polymethylmethacrylate type may be used as the outer layer of an article formed of a thicker sheet or a more inexpensive, less impact- and ultraviolet-resistant polymer composition, e.g., polystyrene.

In producing such multi-wall composite articles, it is generally desirable to utilize composition in such a way that the inner layer of the article, i.e., that nearest the male die, has the greater coefficient of thermal expansion. It is also desirable to provide in the mold sufficient indentations, undercuts, projections or similar irregularities of shape to cause the multiple layers to be bound together by the resulting deformation. The undercut should not exceed in volume one fourth of the part volume to avoid permanent deformation of rubber used as yieldable die member.

In another mode of practicing this invention, deformable sheets of metal may be combined with thermoplastic sheets into composite articles. For example, a metal foil may be placed between two thermoplastic sheets to form a composite having an inner metal layer to provide articles having special decorative or electrical properties. Metal sheets may also be combined with thermoplastic sheets in the same manner that combined articles consisting of two thermoplastic sheets are formed.

The method of this invention is applicable to sheets at least about 0.01 inch thick. It is preferred to apply it to sheets at least about 0.075 inch thick. There is no specific upper limit of thickness, provided the dies are appropriately proportioned and the press sufficiently powerful. Sheets of 1 inch and 1½ inch thickness have been successfully molded by this method, and it can be applied to sheets of 2 to 3 inch thickness.

In simultaneously molding a stack of several sheets, there is no upper limit on the number of sheets or the thickness of the stack, but a thickness of 2 to 3 inches will ordinarily not be exceeded.

The method of this invention applies to the forming of articles of substantially uniform thickness because sheet of uniform thickness is employed as the blank and there is no substantial redistribution of the polymer mass. The method applies particularly to relatively shallow draw, i.e., forming of sheet into articles having a depth to diameter ratio not exceeding about ½:1, designs in which this ratio is up to about 0.25:1 are particularly suitable. In designing dies for this process, it is desirable to have the ratio of curvature within the part at least equal to the initial sheet thickness.

Depending on the selected conditions, it is possible to mold patterned sheet, e.g., embossed sheet, with retention of the pattern. This is achieved by placing the patterned side toward the yieldable die and keeping the temperature of the sheet and the forming pressure employed both in the lower part of the suitable range. It is also possible to emboss designs into the formed parts by forming smooth sheet at temperatures and forming pressures in the high part of the suitable range.

The pressure required in pressing sheets according to this invention is substantially higher than pressures in thermoforming processes, but is still sufficient to permit operation of the process in presses of conventional industrial size, e.g., from 200 to 10,000 tons, depending on the size of the articles to be shaped. Forming pressures may be as low as about 200 p.s.i. and are generally in the range from 1000 to 2000 p.s.i. Higher forming pressures may be employed.

The temperature of the thermoplastic sheet must be above the glass transition temperature of the polymer. This is a property which is reported in the technical literature for most polymers or which can be determined by known methods. The temperature must be below the melting point for crystalline polymers and, for all polymers, below the thermoforming temperature as herein defined, i.e., that temperature at which the sheet would drape or sag under its own weight, or at which it could be deformed by a pressure of about one atmosphere. Elongation of thermoplastic sheet increases with increasing temperature; substantial elongation before break facilitates the method of this invention, and it is therefore desirable to operate on warm sheet. However, retention of strength at the shaping temperature is also important to obtain the advantages of this invention, and for this reason thermoforming temperatures are avoided. For use in the method of this invention, sheet is generally not heated above the temperature at which its tensile strength is still substantially above 100 p.s.i. e.g., as high as 1000 p.s.i. or more.

For polypropylene a suitable temperature is in the range from 150° to 330° F. and the preferred range is from 280° to 325°. For other crystalline polymers, temperatures are also within 50° F. of their crystalline melting point, but sufficiently low to retain the desired tensile strength. For example, linear polyethylene, which melts at about 270° F., is preferably formed at temperatures from 220° to 250° F.

Dwell time after the molds have been brought into contact need be only sufficient to assure stress relaxation in the molded article. This is easily determined by molding several articles at increasing dwell times and otherwise fixed conditions, and measuring springback in the formed articles. In general, dwell times will be in the range from one second to one minute.

The temperature of the dies may have some effect on the required conditions for successful operation. For example, dwell time requirement may be less when the tool is substantially cooler than the sheet. Tool temperatures may vary from about room temperature to upper working temperature limit for the polymer being formed, as defined above. As an example, tool temperatures of about 150° F. were found desirable for shaping polypropylene sheets which were at a temperature of about 300° F. when placed in the press.

I claim as my invention:

1. The method of producing three-dimensionally shaped thermoplastic articles from flat sheets of thermoplastic polymer composition at a working temperature at which the tensile strength of said sheet is substantially above 100 p.s.i., said working temperature being above the polymer glass transition temperature and below the deformation temperature at which said sheet is deformable by application of substantially atmospheric pressure, which comprises
   (a) placing a flat body comprising at least one such sheet, at said working temperature, between a nonyielding three-dimensional die and a laterally confined mass of solid elastomer having a substantially greater volume than said flat body, said die and mass of elastomer being adapted to be forced toward each other by mechanical force,
   (b) firmly securing the rim of said flat body against movement,
   (c) while said rim is thus secured and while the flat body is at said working temperature forcing said mass of solid elastomer and die toward each other by mechanical force to cause said mass of elastomer to contact substantially the entire surface of said flat body, said force being sufficient to provide a forming pressure of at elast about 200 p.s.i. and to cause said mass to deform said flat body to conform to the shape of said die, whereby parts of the shaped article are thinned during said deformation and are strengthened by the resulting orientation,
   (d) retaining said flat body and die in said forced engagement for a sufficient time to relieve stress in the resulting shaped body, and
   (e) removing from said die the resulting article having substantially the dimensions it had while in said forced engagement with said die.

2. The method according to claim 1 wherein said flat body is a single sheet having a thickness in the range from 0.075 inch to 2 inches.

3. The method according to claim 1 wherein said flat body consists of a laminate of at least two sheets of different polymers, and said working temperature is above the highest of the respective glass transition temperatures and below the lowest of the respective deformation temperatures.

4. The method according to claim 1 wherein said flat body consists of a number of superimposed sheets.

5. The method according to claim 1 wherein said flat body consists of at least two sheets of different polymers, said working temperature is above the highest of the respective glass transition temperatures and below the lowest of the respective deformation temperatures, and said die has a sufficient amount of undercut to cause the shaped sheets in the finished article to remain firmly attached to each other.

6. The method according to claim 1 wherein said polymer is characterized by a crystalline melting point, said working temperature is within 50° F. of but below said melting point, said period of retention of sheet and die in forced engagement is in the range from about 1 second to about 1 minute, and the dimensions of the resulting shaped articles are substantially identical to the dimensions of said articles while in forced engagement with said dies.

7. The method according to claim 1 in which said polymer is polypropylene.

8. The method according to claim 1 in which said polymer is polystyrene.

9. The method according to claim 1 in which said polymer is polyvinyl chloride.

10. The method according to claim 1 in which said polymer is a copolymer of acrylonitrile, butadiene and styrene.

11. The method according to claim 1 in which said polymer is an acrylic polymer.

12. The method according to claim 1 in which said polymer is a cellulose ester.

References Cited

UNITED STATES PATENTS

| | | | |
|---|---|---|---|
| 2,362,672 | 11/1944 | Sloan. | |
| 2,385,083 | 9/1945 | Kemerer | 18—56 |
| 2,890,541 | 6/1959 | Siegel | 264—249 |
| 3,319,295 | 5/1967 | Jones-Hinton | 18—19 |
| 2,351,475 | 6/1944 | Berger | 264—320 XR |
| 2,390,803 | 12/1945 | Marschner | 264—316 XR |
| 3,184,524 | 5/1965 | Whiteford | 264—320 XR |
| 3,384,695 | 5/1968 | Murray | 264—322 XR |

FOREIGN PATENTS

| | | |
|---|---|---|
| 944,458 | 6/1956 | Germany. |
| 739,436 | 10/1955 | Great Britain. |

OTHER REFERENCES

Plastics Engineering Handbook, Reinhold Pub. Co., N.Y., 1954, TP986, A2559, p. 182 relied on.

ROBERT F. WHITE, Primary Examiner

R. R. KUCIA, Assistant Examiner

U.S. Cl. X.R.

264—316, 322